(12) United States Patent
Adachihara et al.

(10) Patent No.: US 9,814,984 B2
(45) Date of Patent: Nov. 14, 2017

(54) INFORMATION PROCESSING SYSTEM FOR ENABLING INFORMATION PROCESSING DEVICES TO EXECUTE APPLICATIONS IN AFFILIATION

(71) Applicant: Sony Computer Entertainment Inc., Tokyo (JP)

(72) Inventors: Tadashi Adachihara, Tokyo (JP); Akitsugu Tsuchiya, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/401,863

(22) PCT Filed: Apr. 16, 2013

(86) PCT No.: PCT/JP2013/002567
§ 371 (c)(1),
(2) Date: Nov. 18, 2014

(87) PCT Pub. No.: WO2013/179552
PCT Pub. Date: Dec. 5, 2013

(65) Prior Publication Data
US 2015/0149994 A1 May 28, 2015

(30) Foreign Application Priority Data
May 31, 2012 (JP) .................. 2012-125393

(51) Int. Cl.
G06F 9/44 (2006.01)
G06F 9/445 (2006.01)
(Continued)

(52) U.S. Cl.
CPC .............. *A63F 13/77* (2014.09); *A63F 13/30* (2014.09); *A63F 13/73* (2014.09); *A63F 13/92* (2014.09);
(Continued)

(58) Field of Classification Search
None
See application file for complete search history.

(56) References Cited

U.S. PATENT DOCUMENTS 6,544,126 B2 4/2003 Sawano
6,567,845 B1 5/2003 Chatani
(Continued)

FOREIGN PATENT DOCUMENTS

CN 1274296 A 11/2000
CN 102375752 A1 3/2006
(Continued)

OTHER PUBLICATIONS

Cox, Caleb. "Nintendo takes control with next-gen games console." Personal Tech, Jun. 7, 2011, www.theregister.co.uk/2011/06/07/nintendo_unveils_wii_u/. Accessed May 30, 2017.*
(Continued)

*Primary Examiner* — Wei Zhen
*Assistant Examiner* — Binh Luu
(74) *Attorney, Agent, or Firm* — Matthew B. Dernier, Esq.

(57) ABSTRACT

An information acquisition unit of a portable game machine is configured to acquire identification information to identify an application to be activated in the portable game machine from a stationary game machine. A determination unit of the portable game machine is configured to determine whether or not the portable game machine has the application identified by the identification information. If the portable game machine has the application, an application activation unit of the portable game machine is configured to activate the application. On the other hand, if the portable game machine does not have the application, a download processor of the portable game machine is configured to acquire the application from the stationary game machine.

14 Claims, 10 Drawing Sheets

(51) Int. Cl.
　　　*A63F 13/77*　　(2014.01)
　　　*A63F 13/73*　　(2014.01)
　　　*A63F 13/30*　　(2014.01)
　　　*A63F 13/92*　　(2014.01)

(52) U.S. Cl.
　　　CPC .......... *G06F 8/61* (2013.01); *A63F 2300/204* (2013.01); *A63F 2300/552* (2013.01)

(56) References Cited

U.S. PATENT DOCUMENTS

| | | | |
|---|---|---|---|
| 6,694,440 B1* | 2/2004 | Ishibashi | G06F 1/3209 713/300 |
| 9,308,455 B1* | 4/2016 | Kopikare | A63F 13/358 |
| 2001/0039212 A1 | 11/2001 | Sawano | |
| 2003/0145316 A1* | 7/2003 | McKinlay | G06F 8/61 717/173 |
| 2004/0083474 A1* | 4/2004 | McKinlay | G06F 8/61 717/176 |
| 2004/0117439 A1* | 6/2004 | Levett | G06F 9/46 709/203 |
| 2006/0048141 A1 | 3/2006 | Persson | |
| 2008/0270310 A1 | 10/2008 | Gaurav | |
| 2010/0137046 A1 | 6/2010 | Kataoka | |
| 2010/0248823 A1* | 9/2010 | Smith | A63F 13/12 463/29 |
| 2011/0107239 A1* | 5/2011 | Adoni | A63F 13/12 715/757 |
| 2012/0036218 A1 | 2/2012 | Oh | |
| 2012/0071139 A1 | 3/2012 | Kumar | |
| 2012/0110568 A1* | 5/2012 | Abel | G06F 8/61 717/178 |
| 2012/0179884 A1 | 7/2012 | Araki | |
| 2012/0180034 A1* | 7/2012 | Hatamoto | G06F 8/65 717/168 |
| 2012/0233622 A1* | 9/2012 | He | G06F 9/5055 718/102 |
| 2013/0080435 A1* | 3/2013 | Gieseke | G06Q 30/06 707/737 |
| 2014/0221087 A1* | 8/2014 | Huang | G06F 9/45533 463/31 |
| 2014/0328337 A1 | 11/2014 | Yamazaki | |

FOREIGN PATENT DOCUMENTS

| | | |
|---|---|---|
| CN | 101359392 A | 2/2009 |
| JP | 2000003271 A | 1/2000 |
| JP | 2001029653 A | 2/2001 |
| JP | 2002011250 A | 1/2002 |
| JP | 2002369969 A | 12/2002 |
| JP | 2003296119 A | 10/2003 |
| JP | 2005258628 A | 9/2005 |
| JP | 2005275891 A | 10/2005 |
| JP | 2007125105 A | 5/2007 |
| JP | 2008012072 A | 1/2008 |
| JP | 2012019502 A | 1/2012 |
| JP | 2012143269 A | 8/2012 |
| WO | WO 2005039715 A2 * | 5/2005 ............. A63F 13/12 |

OTHER PUBLICATIONS

International Search Report for corresponding PCT application No. PCT/JP2013/002567, dated May 28, 2013.
International Preliminary Report on Patentability and Written Opinion for corresponding PCT application No. PCT/JP2013/002567, dated Dec. 11, 2014.
Office Action for corresponding JP application No. 2012-125393, dated Mar. 3, 2015.
Akihisa Koike, everybody's tennis portable, Sony Computer Entertainment Inc., 10 pages, dated Aug. 12, 2010 (for relevancy see Office Action for corresponding JP application No. 2012-125393, pp. 1-16, dated Mar. 3, 2015 disclosed to the USPTO on Mar. 26, 2015).
Office Action for corresponding JP application No. 2012-125393, 11 pages, dated Nov. 4, 2015.
European Search Report for corresponding EP application No. 13796334, 9 pages, dated May 30, 2016.
Office Action for corresponding CN application No. 2013800267393, 16 pages, dated Sep. 29, 2016.

\* cited by examiner

FIG. 2
(a)
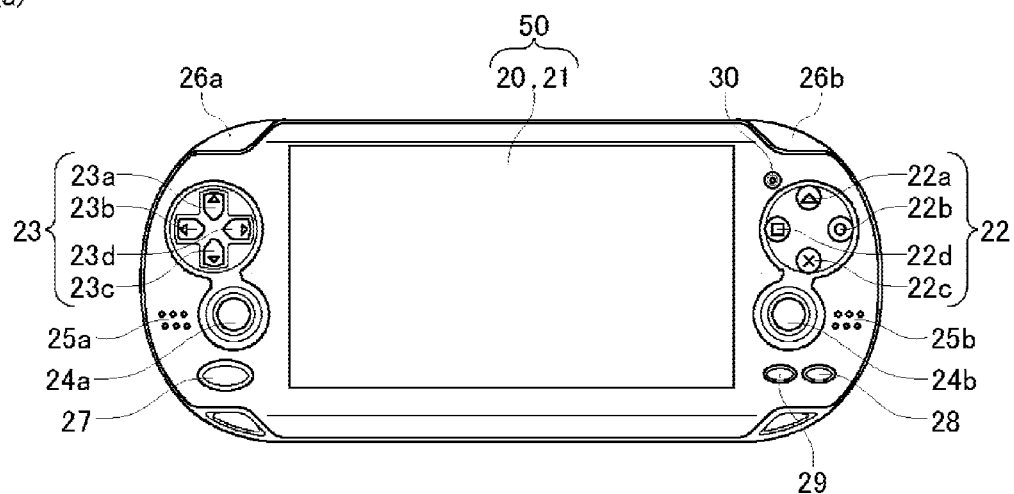
(b)
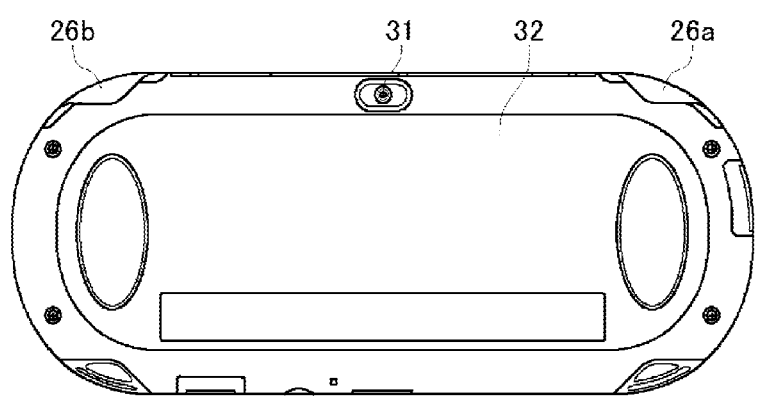

FIG. 3
(a)
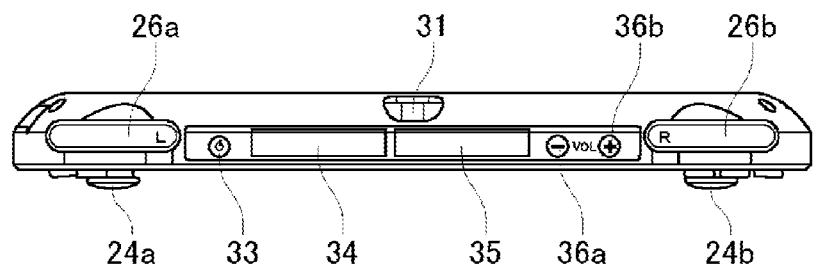
(b)
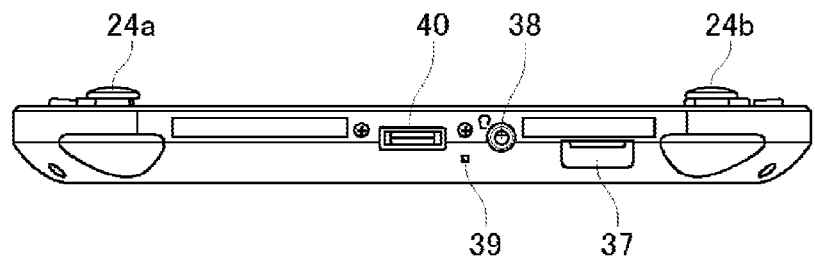
(c)
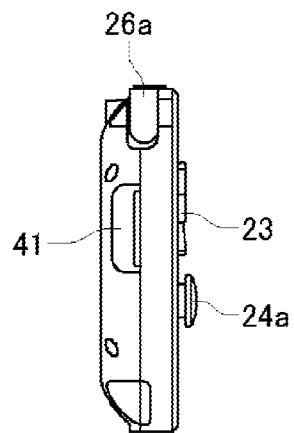

5

20

20

20

ID
INFORMATION PROCESSING SYSTEM FOR ENABLING INFORMATION PROCESSING DEVICES TO EXECUTE APPLICATIONS IN AFFILIATION

TECHNICAL FIELD

The present invention relates to an information processing device and an information processing system.

BACKGROUND ART

Between stationary game machines and portable game machines, the platform such as operating system (OS) and hardware is different. PTL 1 proposes a game system in which a stationary game machine and a portable game machine share an image file relating to a game by utilizing an emulation technique.

CITATION LIST

Patent Literature

[PTL 1]
US 2010/0,137,046 A

SUMMARY

Technical Problem

Conventionally, it is general that an online match game is played between game machines having the same platform. However, portable game machines of recent years have become capable of exerting performance comparable to that of stationary game machines and it has also become realistic that a user who operates a stationary game machine and a user who operates a portable game machine play an online match. Therefore, it is preferable to allow provision of a mechanism by which game machines having different platforms can efficiently execute a game in affiliation. It is desired to develop a technique by which game machines having the same platform can also efficiently execute a game in affiliation.

Therefore, the present invention is intended to provide a technique that allows at least two information processing devices to efficiently execute an application in affiliation.

Solution to Problem

To solve the above-described problem, an information processing device of a certain aspect of the present invention is an information processing device including: an information acquirer that acquires identification information to identify an application to be activated in the information processing device from another information processing device; a determiner that determines whether or not the information processing device has the application identified by the identification information; an application activator that activates the application if the information processing device has the application; and a download processing section that acquires the application from the another information processing device if the information processing device does not have the application.

Another aspect of the present invention is an information processing system. This information processing system is an information processing system that is so configured as to include a first information processing device and a second information processing device having a platform different from a platform of the first information processing device. The first information processing device includes a first install processing section that installs a first application to be executed in the first information processing device and a storage device that holds a second application to be executed in the second information processing device. The second information processing device includes an information acquirer that acquires identification information to identify an application to be activated in the second information processing device from the first information processing device, a determiner that determines whether or not the second information processing device has the application identified by the identification information, a download processing section that acquires the second application from the first information processing device if the second information processing device does not have the application, and a second install processing section that performs automatic install of the application acquired by the download processing section.

What are obtained by translating arbitrary combinations of the above constituent elements and expressions of the present invention among method, device, system, recording medium, computer program, and so forth are also effective as aspects of the present invention.

BRIEF DESCRIPTION OF DRAWINGS

FIG. 2

(a) is a diagram illustrating the front surface of a portable game machine, and (b) is a diagram illustrating the rear surface of the portable game machine.

FIG. 3

(a) is a diagram illustrating the upper surface of the portable game machine, (b) is a diagram illustrating the lower surface of the portable game machine, and (c) is a diagram illustrating the left side surface of the portable game machine.

Figure 4:
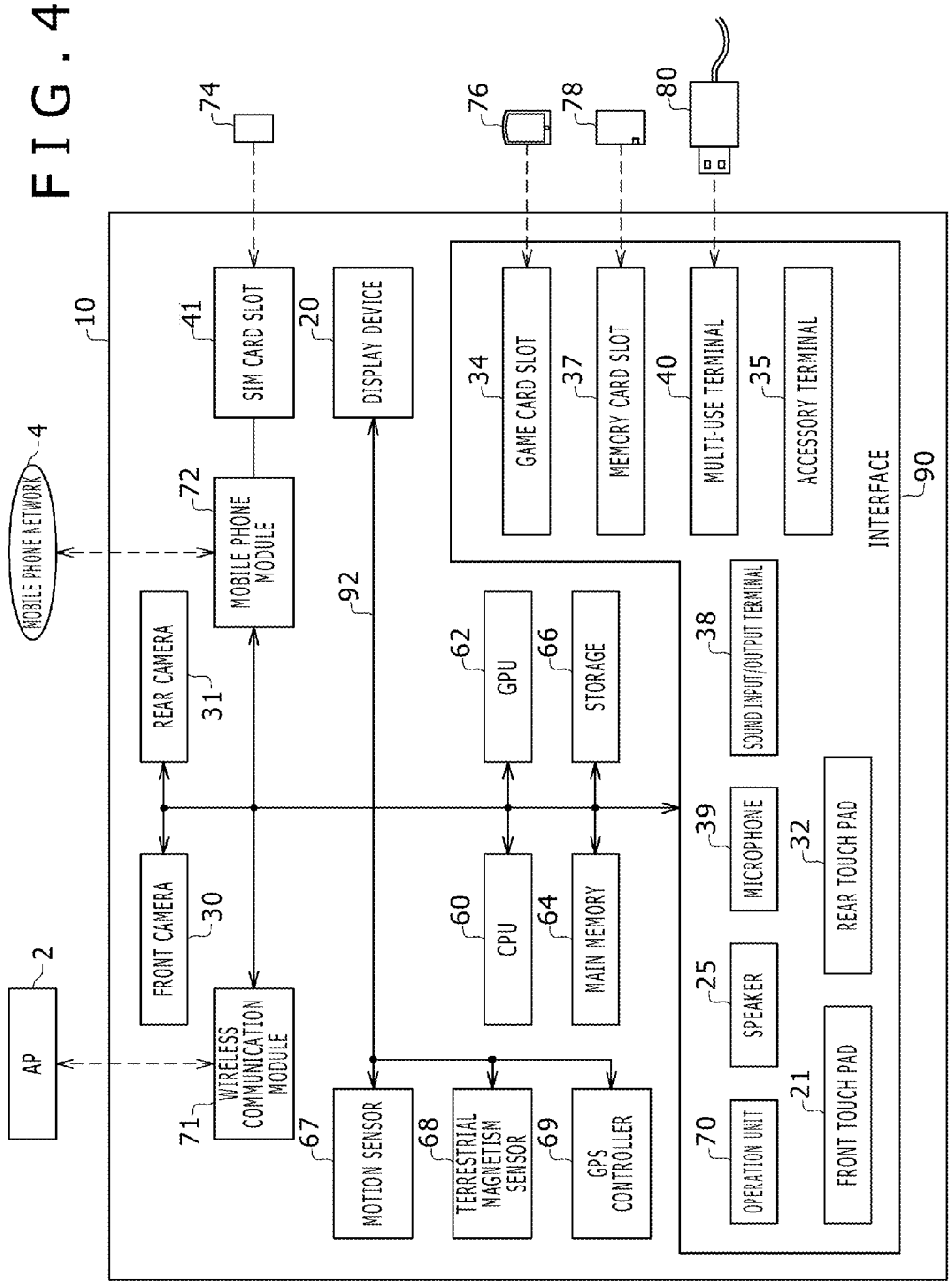

FIG. 4 is a diagram illustrating the circuit configuration of the portable game machine.

Figure 5:
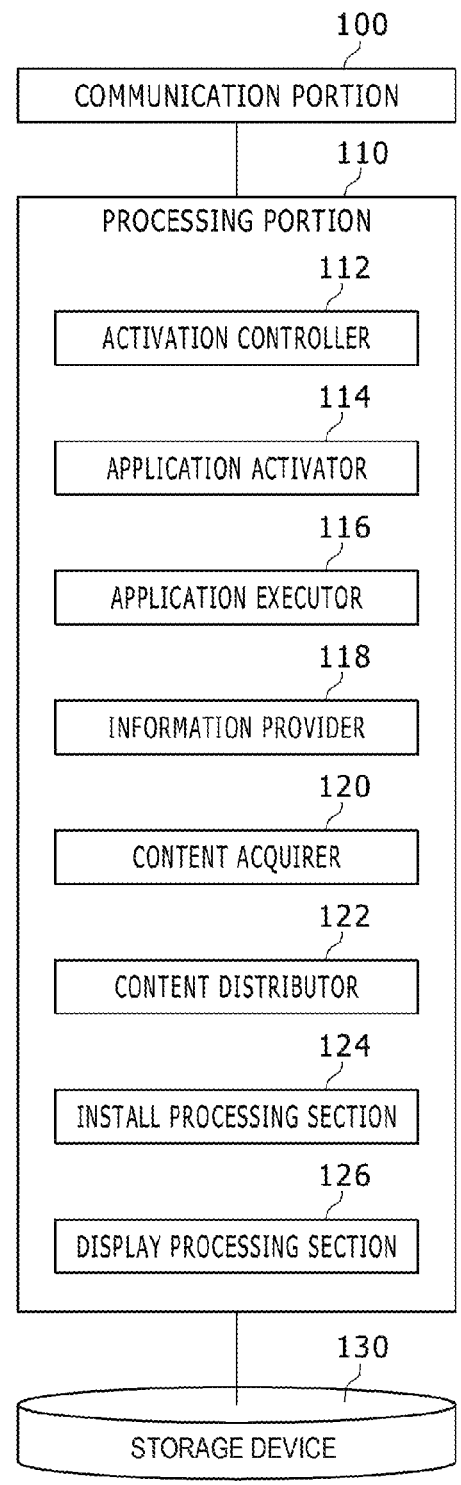

FIG. 5 is a diagram illustrating functional blocks of a stationary game machine.

Figure 6:
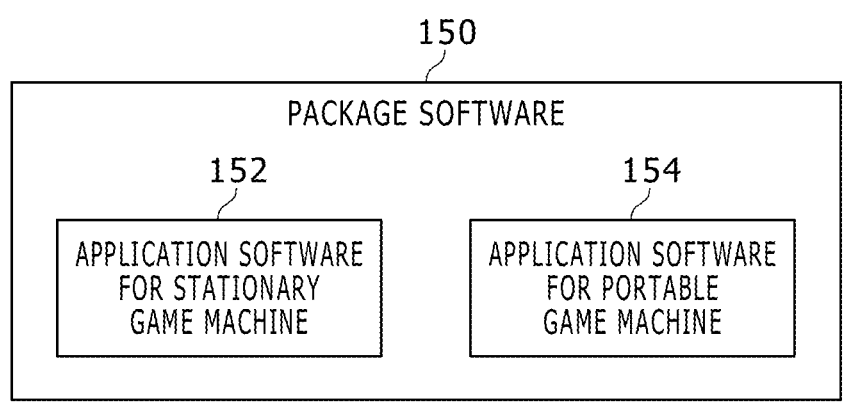

FIG. 6 is a diagram illustrating one example of package software.

Figure 7:
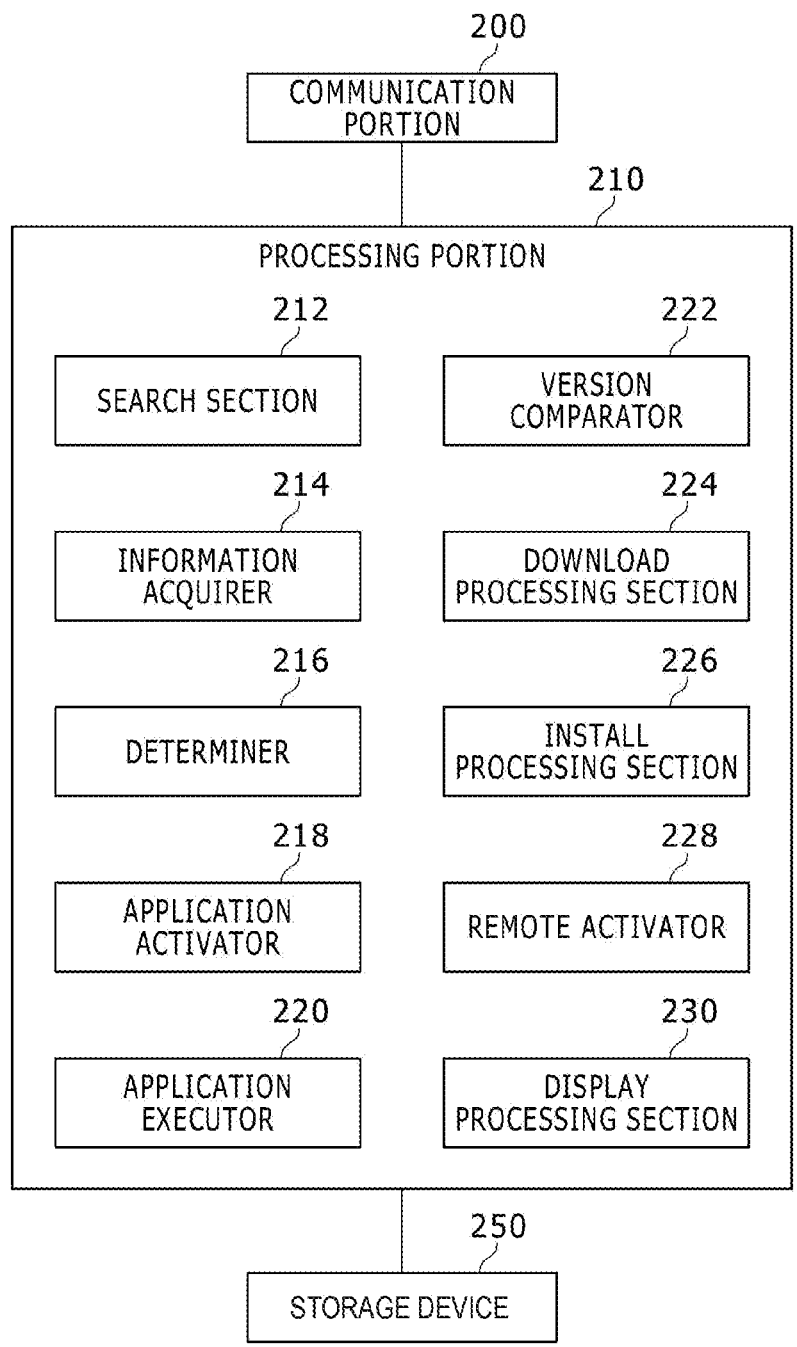

FIG. 7 is a diagram illustrating functional blocks of the portable game machine.

Figure 8:
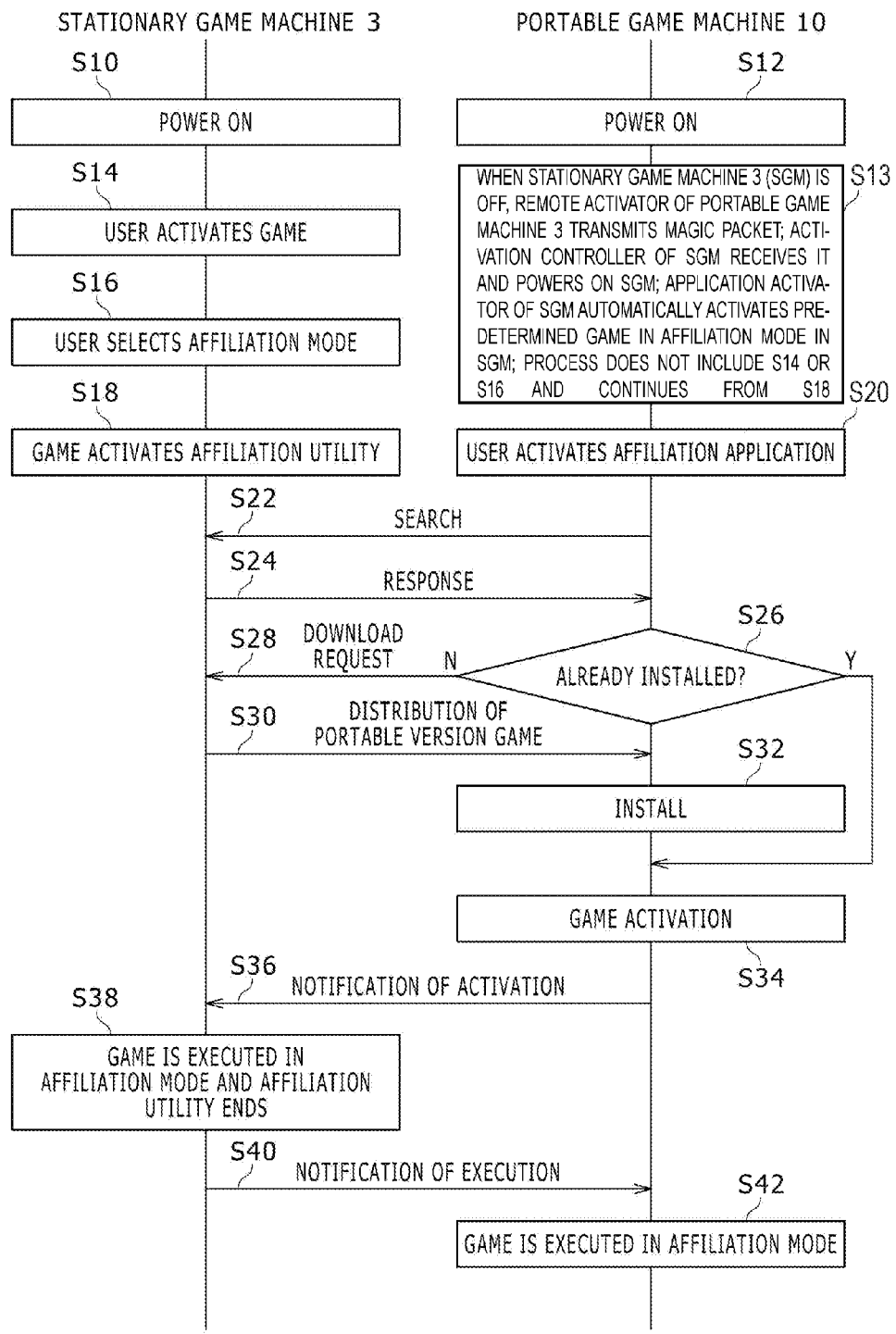

FIG. 8 is a sequence diagram of execution of a game between the game machines in affiliation.

Figure 9:
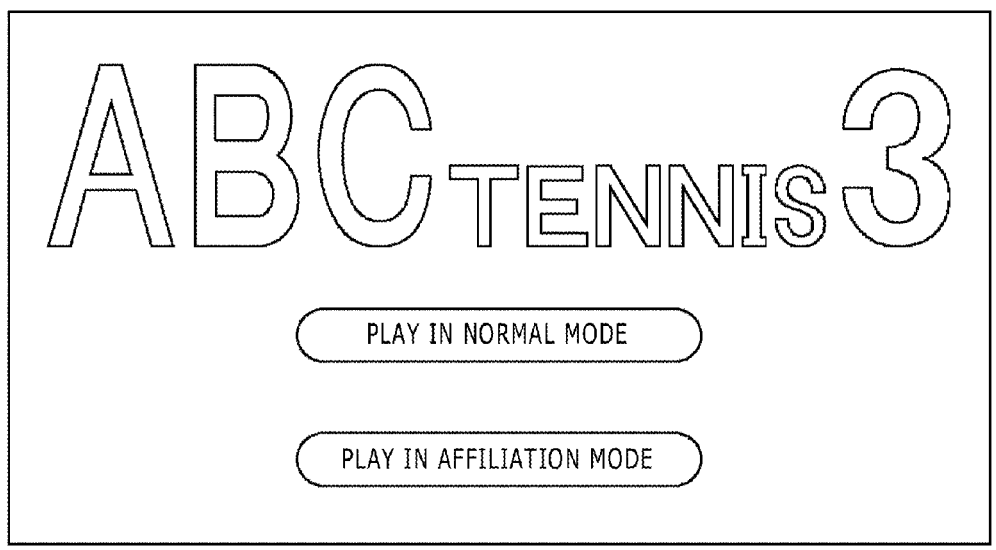

FIG. 9 is a diagram illustrating an activation screen of the game.

Figure 10:
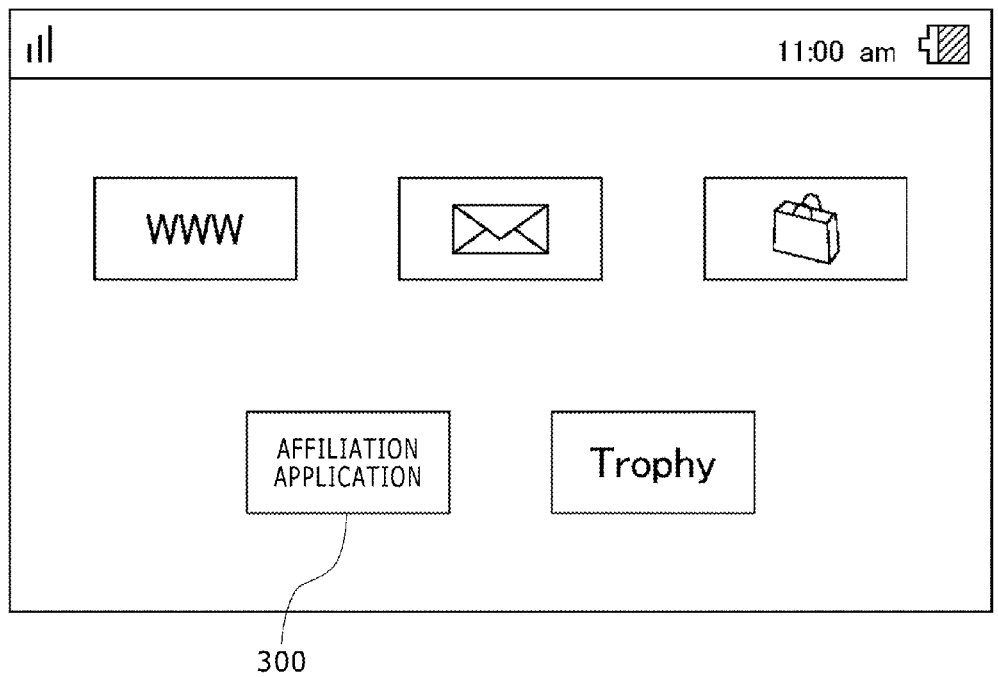

FIG. 10 is a diagram illustrating a menu screen.

Figure 11:
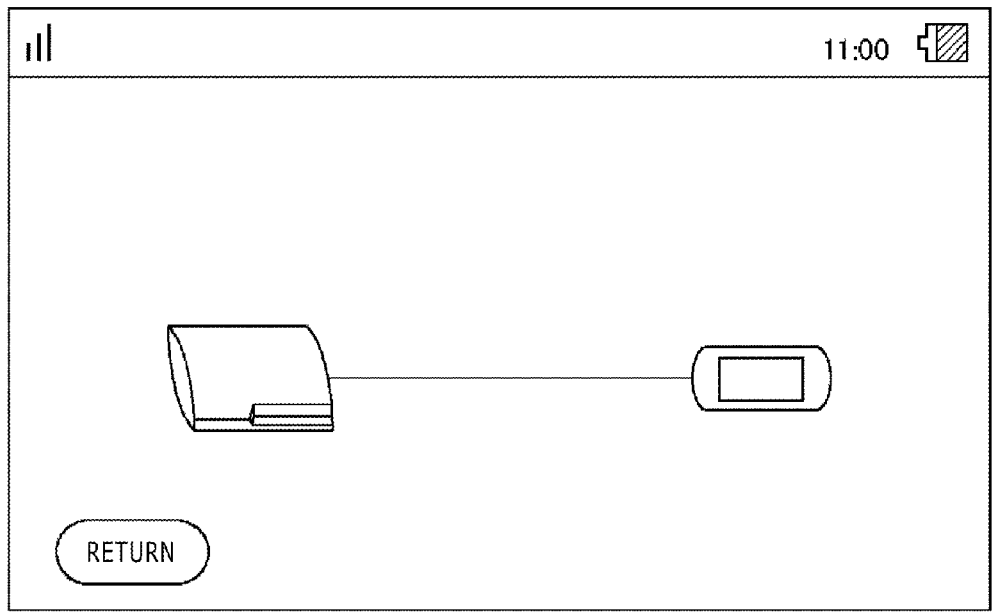

FIG. 11 is a diagram illustrating an explanatory screen when an affiliation application is activated.

Figure 12:
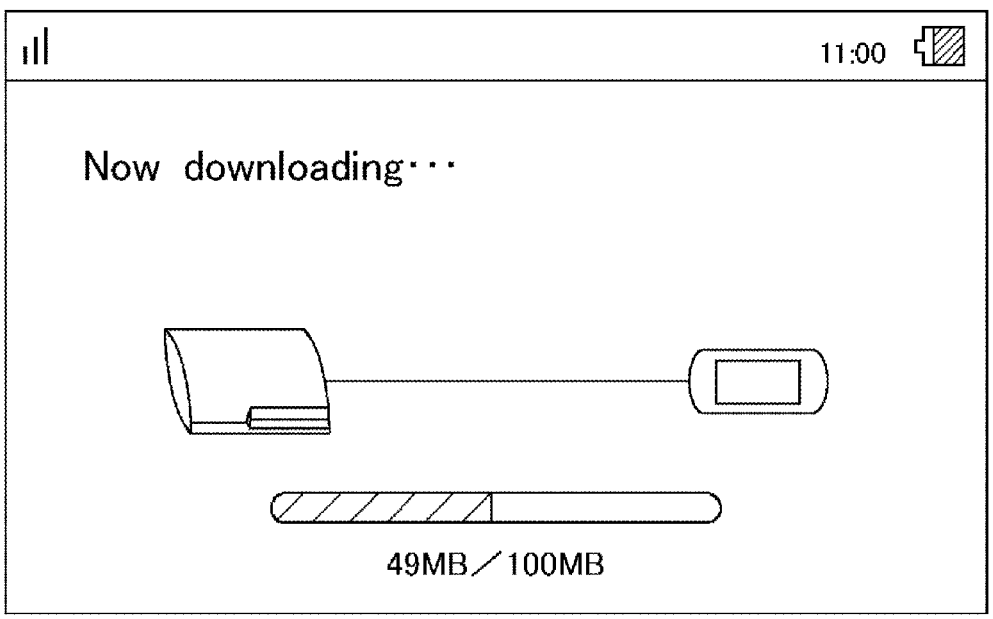

FIG. 12 is a diagram illustrating the progress of a download.

DESCRIPTION OF EMBODIMENTS

Figure 1:
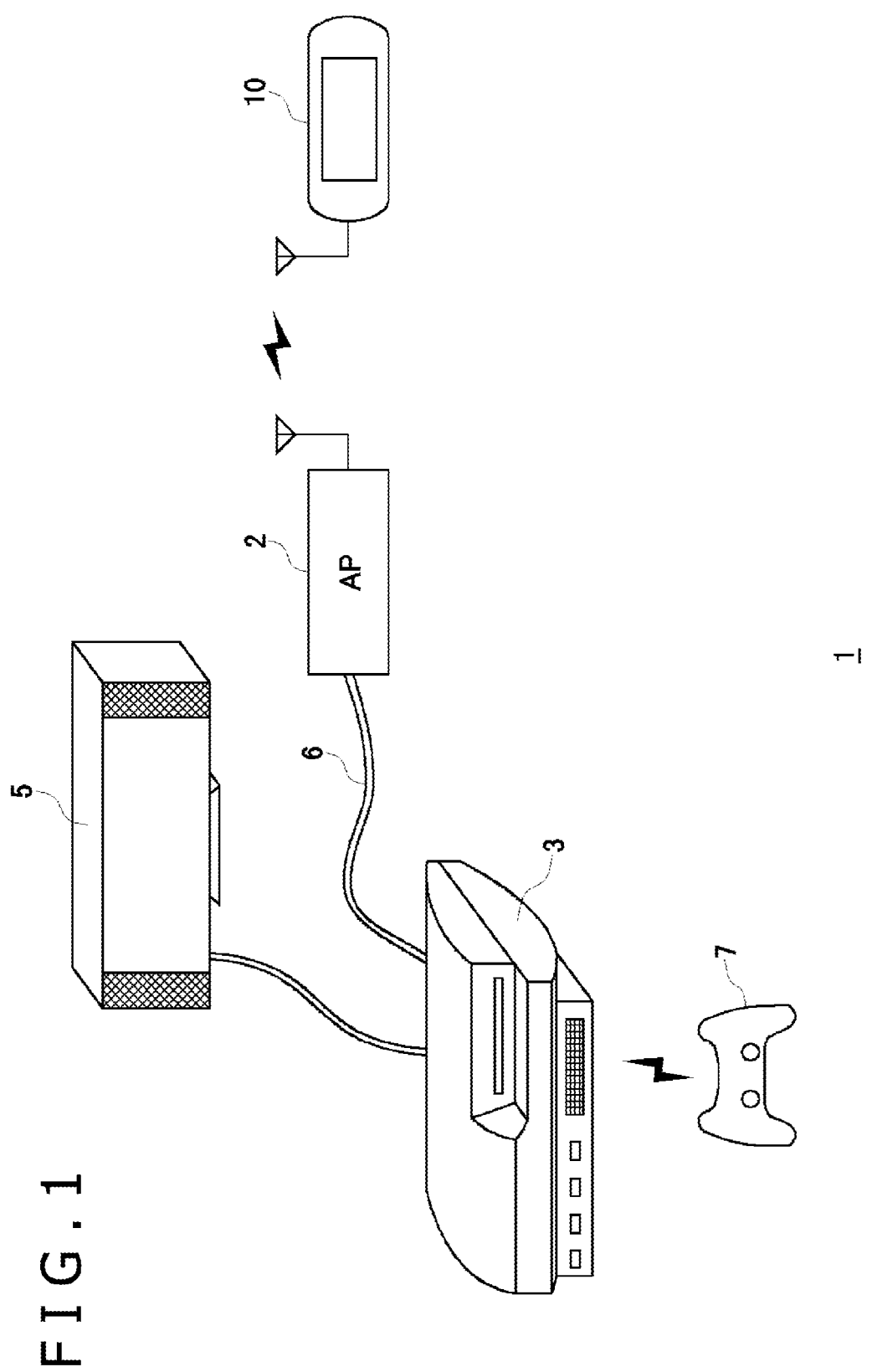
FIG. 1 is a diagram illustrating one example of the configuration of an information processing system according to an exemplary embodiment.

FIG. 1 illustrates one example of the configuration of an information processing system 1 according to an exemplary embodiment. In the information processing system 1, a stationary game machine 3 and a portable game machine 10 can perform mutual data transmission and reception via an access point (hereinafter, referred to as "AP") 2. The AP 2 has functions of a wireless access point and a router and the portable game machine 10 and the stationary game machine 3 connect via the AP 2. The portable game machine 10 and the stationary game machine 3 may be capable of forming an ad hoc network and directly transmitting and receiving data. Furthermore, they may be capable of transmitting and receiving data via a server (not illustrated) that connects to the Internet.

The portable game machine 10 has a wireless communication function and wirelessly connects to the AP 2. The portable game machine 10 has a communication function based on a wireless LAN (Local Area Network) system and wirelessly connects to the AP 2 in an infrastructure mode. If the portable game machine 10 and the stationary game machine 3 communicate via an external server, the portable game machine 10 may communicate with the stationary game machine 3 by a communication system employed for mobile phones, such as the third generation mobile communications system.

The stationary game machine 3 is connected to the AP 2 by a cable 6. The stationary game machine 3 connects to a game controller 7 operated by a user in a wireless or wired manner and accepts an operation signal from the game controller 7. The stationary game machine 3 connects to a display device 5 and makes the display device 5 output a processing result. The display device 5 may be a television having a display to output images and a speaker to output sounds or may be a computer display. The display device 5 may be connected to the stationary game machine 3 by a wired cable or may be wirelessly connected thereto by a wireless LAN.

In the present exemplary embodiment, the stationary game machine 3 is one example of the information processing device and the portable game machine 10 is one example of the information processing device having a platform different from that of the stationary game machine 3. As just described, the stationary game machine 3 and the portable game machine 10 have different kinds of hardware and operating systems (OS). The present exemplary embodiment provides the information processing system 1 in which at least two information processing devices can execute an application in affiliation. In the information processing system 1, plural information processing devices having different platforms may execute an application in affiliation like the stationary game machine 3 and the portable game machine 10. However, plural information processing devices having the same platform may execute an application in affiliation.

The appearance configuration and circuit configuration of the portable game machine 10 of the present exemplary embodiment will be described.

[Configuration of Front Surface Part]

FIG. 2(a) illustrates the front surface of the portable game machine 10. The portable game machine 10 is formed of a horizontally-long housing and left and right areas held by the user have an arc-shaped outline contour. A rectangular touch panel 50 is provided on the front surface of the portable game machine 10. The touch panel 50 is composed of a display device 20 and a transparent front touch pad 21 that covers the surface of the display device 20. The display device 20 is an organic EL (Electro-Luminescence) panel and displays images. The display device 20 may be display means such as a liquid crystal panel. The front touch pad 21 is a multi-touch pad having a function to detect plural points touched simultaneously and the touch panel 50 is formed as a multi-touch screen.

A triangle button 22a, a circle button 22b, a cross button 22c, and a square button 22d (hereinafter, referred to as "operation buttons 22" when generically termed) each located at a vertex of a rhomboid are provided on the right side of the touch panel 50. An up key 23a, a left key 23b, a down key 23c, and a right key 23d (hereinafter, referred to as "directional keys 23" when generically termed) are provided on the left side of the touch panel 50. The user can input eight directions, upward, downward, left, and right directions and oblique directions, by operating the directional keys 23. A left stick 24a is provided below the directional keys 23 and a right stick 24b is provided below the operation buttons 22. The user tilts the left stick 24a or the right stick 24b (hereinafter, referred to as "analog sticks 24" when generically termed) to input a direction and the amount of tilt. An L button 26a and an R button 26b are provided at the left and right top parts of the housing. The operation buttons 22, the directional keys 23, the analog sticks 24, the L button 26a, and the R button 26b form operation means operated by the user.

A front camera 30 is provided near the operation buttons 22. A left speaker 25a and a right speaker 25b (hereinafter, referred to as "speakers 25" when generically termed) that each output sounds are provided on the left side of the left stick 24a and on the right side of the right stick 24b. Furthermore, a HOME button 27 is provided below the left stick 24a and a START button 28 and a SELECT button 29 are provided below the right stick 24b.

[Configuration of Rear Surface Part]

FIG. 2(b) illustrates the rear surface of the portable game machine 10. A rear camera 31 and a rear touch pad 32 are provided on the rear surface of the portable game machine 10. The rear touch pad 32 is formed as a multi-touch pad similarly to the front touch pad 21. The portable game machine 10 is provided with the two cameras and touch pads on the front and rear surfaces.

[Configuration of Upper Surface Part]

FIG. 3(a) illustrates the upper surface of the portable game machine 10. As already described, the L button 26a and the R button 26b are provided on the left and right end sides, respectively, of the upper surface of the portable game machine 10. A power button 33 is provided on the right side of the L button 26a and the user turns the power on or off by pressing down the power button 33 for at least a predetermined time (e.g. two seconds). The portable game machine 10 has a power control function of transitioning to a suspend state when a period during which the operation means is not operated (no-operation period) lasts for a predetermined time. When the portable game machine 10 enters the suspend state, the user can bring the portable game machine 10 back to an awake state from the suspend state by pressing down the power button 33 for a short time (e.g. at most two seconds).

A game card slot 34 is a slot in which to insert a game card. In this diagram, a state in which the game card slot 34 is covered by a slot cover is illustrated. An LED lamp that blinks when the game card is being accessed may be provided near the game card slot 34. An accessory terminal 35 is a terminal for connecting peripheral apparatus (accessory). In this diagram, a state in which the accessory terminal 35 is covered by a terminal cover is illustrated. A negative button 36a and a positive button 36b for adjusting the sound volume are provided between the accessory terminal 35 and the R button 26b.

[Configuration of Lower Surface Part]

FIG. 3(b) illustrates the lower surface of the portable game machine 10. A memory card slot 37 is a slot in which to insert a memory card. In this diagram, a state in which the memory card slot 37 is covered by a slot cover is illustrated. A sound input/output terminal 38, a microphone 39, and a multi-use terminal 40 are provided in the lower surface of the portable game machine 10. The multi-use terminal 40 is compatible with a USB (Universal Serial Bus) and can connect to another piece of apparatus via a USB cable.

[Configuration of Left Side Surface Part]

FIG. 3(*c*) illustrates the left side surface of the portable game machine 10. A SIM card slot 41 serving as a slot for a SIM card is provided in the left side surface of the portable game machine 10.

[Circuit Configuration of Portable Game Machine]

FIG. 4 illustrates the circuit configuration of the portable game machine 10. The respective components thereof are connected to each other by a bus 92. A wireless communication module 71 is formed of a wireless LAN module that complies with a communication standard such as IEEE 802.11b/g and connects to another information processing device and an external network via the AP 2. The wireless communication module 71 may have a communication function of the Bluetooth (registered trademark) protocol. A mobile phone module 72 is compatible with a third generation digital mobile phone system that complies with the IMT-2000 (International Mobile Telecommunication 2000) standard defined by ITU (International Telecommunication Union) and connects to a mobile phone network 4. A SIM card 74 in which a unique ID number for identifying the phone number of a mobile phone is recorded is inserted into the SIM card slot 41. The insertion of the SIM card 74 into the SIM card slot 41 allows the mobile phone module 72 to communicate with the mobile phone network 4.

The portable game machine 10 can establish an ad hoc network with another portable game machine 10 by using the wireless communication module 71. In this case, the portable game machines 10 can directly connect to each other without requiring an infrastructure such as the AP 2.

A CPU (Central Processing Unit) 60 executes a program loaded into a main memory 64 and so forth. A GPU (Graphics Processing Unit) 62 performs the calculation necessary for image processing. The main memory 64 is formed of a RAM (Random Access Memory) or the like and stores a program to be used by the CPU 60, data, etc. A storage 66 is formed of a NAND-type flash memory or the like and is used as a built-in auxiliary storage device.

A motion sensor 67 detects the motion of the portable game machine 10 and a terrestrial magnetism sensor 68 detects the terrestrial magnetism in three-axis directions. A GPS controller 69 receives signals from GPS satellites and calculates the present location. The front camera 30 and the rear camera 31 capture an image and input image data. The front camera 30 and the rear camera 31 are formed of a CMOS image sensor (Complementary Metal Oxide Semiconductor Image Sensor).

The display device 20 is an organic EL display device and has light emitting elements that emit light through application of voltage to the cathode and anode thereof. In a power saving mode, by setting the voltage applied between the electrodes lower than usual, the display device 20 can be set to a dimmed state, so that the power consumption can be suppressed. The display device 20 may be a liquid crystal panel display device provided with a backlight. In the power saving mode, by lowering the amount of light of the backlight, the liquid crystal panel display device can be set to a dimmed state, so that the power consumption can be suppressed.

In an interface 90, an operation unit 70 includes various kinds of operation means in the portable game machine 10. Specifically, the operation unit 70 includes the operation buttons 22, the directional keys 23, the analog sticks 24, the L button 26*a*, the R button 26*b*, the HOME button 27, the START button 28, the SELECT button 29, the power button 33, the negative button 36*a*, and the positive button 36*b*. The front touch pad 21 and the rear touch pad 32 are multi-touch pads and the front touch pad 21 is so disposed as to be overlapped with the surface of the display device 20. The speakers 25 output sounds created by the respective functions of the portable game machine 10 and the microphone 39 inputs ambient sounds of the portable game machine 10. The sound input/output terminal 38 inputs stereo sounds from an external microphone and outputs stereo sounds to external headphones or the like.

A game card 76 in which a game file is recorded is inserted into the game card slot 34. The game card 76 has a data-writable recording area. When the game card 76 is loaded into the game card slot 34, data writing/reading is performed by a media drive. A memory card 78 is inserted into the memory card slot 37. When being loaded into the memory card slot 37, the memory card 78 is used as an external auxiliary storage device. The multi-use terminal 40 can be used as a USB terminal. A USB cable 80 is connected thereto and the multi-use terminal 40 performs data transmission and reception with another piece of USB apparatus. To the accessory terminal 35, peripheral apparatus is connected.

FIG. 5 illustrates functional blocks of the stationary game machine 3. The stationary game machine 3 includes a communication portion 100, a processing portion 110, and a storage device 130. The communication portion 100 communicates with the portable game machine 10 or communicates with a network server and a content server that connects to the Internet via the AP 2. Data transmitted from the processing portion 110 or data to be acquired by the processing portion 110 goes through the communication portion 100. The storage device 130 is a large-capacity auxiliary storage device and may be e.g. a hard disc drive. The processing portion 110 has an activation controller 112, an application activator 114, an application executor 116, an information provider 118, a content acquirer 120, a content distributor 122, an install processing section 124, and a display processing section 126. These components are implemented by a CPU of an arbitrary computer, a memory, a program loaded into the memory, and so forth in terms of hardware components. Here, functional blocks implemented by cooperation of them are drawn. Therefore, it is understood by those skilled in the art that these functional blocks can be implemented in various forms by only hardware or only software or a combination of them.

The content acquirer 120 acquires package software of an application from a content server that connects to the Internet via the communication portion 100 and holds it in the storage device 130. FIG. 6 illustrates one example of package software 150. In the package software 150, application software for a stationary game machine (hereinafter, referred to also as "stationary version application") 152 and application software for a portable game machine (hereinafter, referred to also as "portable version application") 154 are included. Each piece of application software includes a main program to execute a game application, an activation file for activating the main program, game data of game characters, scenarios, and so forth, identification information for identifying the game title (hereinafter, referred to also as "title ID"), version information of game software, and so forth. The main program is a program necessary to execute the application and the game progresses by running the main program. The activation file is a program for activating the main program. When the activation file is executed, the main program is called and executed.

The package software 150 is downloaded into the storage device 130 by the content acquirer 120 and is installed. The installed stationary version application 152 is executed in the stationary game machine 3 whereas the portable version application 154 is transferred to the portable game machine 10 to be installed and executed in the portable game machine 10. The stationary version application 152 and the portable version application 154 include the main programs of game titles related to each other. The game titles related to each other mainly mean the same game title. However, the binary data of the program and the title ID are different because they are executed in information processing devices having different platforms. That is, although the stationary version application 152 and the portable version application 154 are e.g. a game of "ABC tennis 3" as the same game title, the binary data and title ID of them are different.

In the information processing system 1, the portable game machine 10 is a wireless communication terminal and therefore its speed of communication with a content server is relatively slow compared with the stationary game machine 3, which is a wired communication terminal. Therefore, the portable version application 154 is also made to be included in the package software 150 to be downloaded by the stationary game machine 3 and the portable game machine 10 is allowed to acquire the portable version application 154 from the stationary game machine 3 later. This makes it possible that the stationary game machine 3 and the portable game machine 10 efficiently execute the application in affiliation.

When the content acquirer 120 acquires the package software 150, the install processing section 124 installs the stationary version application 152. This makes it possible that the application activator 114 activates the stationary version application 152 and the application executor 116 executes the stationary version application 152. To activate the stationary version application 152 is to execute the activation file included in the stationary version application 152. Through execution of the activation file, the application executor 116 calls the main program and executes the stationary version application 152.

FIG. 7 illustrates functional blocks of the portable game machine 10. The portable game machine 10 includes a communication portion 200, a processing portion 210, and a storage device 250. The communication portion 200 communicates with the stationary game machine 3 via the AP 2. The communication portion 200 is the wireless communication module 71 and may be the mobile phone module 72 when communicating with the stationary game machine 3 via an external server. Data transmitted from the processing portion 210 or data to be acquired by the processing portion 210 goes through the communication portion 200. The storage device 250 is an auxiliary storage device and may be the memory card 78. The processing portion 210 has a search section 212, an information acquirer 214, a determiner 216, an application activator 218, an application executor 220, a version comparator 222, a download processing section 224, an install processing section 226, a remote activator 228, and a display processing section 230. These components are implemented by the CPU 60 of the computer, the main memory 64, a program loaded into the main memory 64, and so forth in terms of hardware components. Here, functional blocks implemented by cooperation of them are drawn. Therefore, it is understood by those skilled in the art that these functional blocks can be implemented in various forms by only hardware or only software or a combination of them.

In the portable game machine 10, the download processing section 224 downloads the portable version application 154 from the stationary game machine 3 via the communication portion 200 and the install processing section 226 executes automatic install of the portable version application 154. Here, the automatic install refers to processing in which, without the need for user operation, the install processing section 226 automatically installs the portable version application 154 when receiving notification of download completion from the download processing section 224 after the completion of download processing. This makes it possible that the application activator 218 activates the portable version application 154 and the application executor 220 executes the portable version application 154. To activate the portable version application 154 is to execute the activation file included in the portable version application 154. Through execution of the activation file, the application executor 220 calls the main program and executes the portable version application 154.

In the information processing system 1 of the present exemplary embodiment, the stationary game machine 3 and the portable game machine 10 having different platforms execute related game applications in affiliation. For this purpose, the stationary version application 152 and the portable version application 154 each have a mode to execute the application in affiliation (hereinafter, referred to as "affiliation mode"). Through execution of both in the affiliation mode, processing in which affiliation is made between both can be executed. As one use case, a case in which two users operate the stationary game machine 3 and the portable game machine 10, respectively, to play a match game together is cited. However, a use case with affiliation among plural game machines is not limited thereto. Through execution of the stationary version application 152 and the portable version application 154 in the affiliation mode in the stationary game machine 3 and the portable game machine 10, processing in which the stationary version application 152 and the portable version application 154 affiliate can be executed.

To implement the affiliation between the game machines, the stationary game machine 3 installs an "affiliation utility" and the portable game machine 10 installs an "affiliation application." The affiliation utility installed in the stationary game machine 3 executes at least part of the functions in the processing portion 110 (see FIG. 5) and implements also a function of a Web server. Specifically, the Web server function is implemented by the information provider 118 and the activation controller 112. The affiliation application installed in the portable game machine 10 executes at least part of the functions in the processing portion 210 (see FIG. 7).

FIG. 8 is a sequence diagram of execution of a game between two game machines in affiliation. In this sequence diagram, the stationary game machine 3 and the portable game machine 10 are both in the state of being powered ON by users (S10, S12). In the following, an example will be illustrated in which a game title "ABC tennis 3" having a function of play in the affiliation mode is executed in affiliation in the stationary game machine 3 and the portable game machine 10.

When the user of the stationary game machine 3 selects an icon of the game title "ABC tennis 3" in a menu screen displayed on the display device 5, the application activator 114 activates the game of "ABC tennis 3" and the application executor 116 generates an activation screen (S14). The application activated by the application activator 114 is equivalent to the stationary version application 152 illustrated in FIG. 6 and the functions of the application executor 116 are implemented by the main program.

FIG. 9 illustrates the activation screen of "ABC tennis 3" displayed on the display device 5, which connects to the stationary game machine 3. In the activation screen, choices of the play mode are presented. Here, the user is allowed to select play in the normal mode or the affiliation mode. When the user selects play in the affiliation mode by using the game controller 7 (S16), the application executor 116 activates the affiliation utility (S18). By the activation of the affiliation utility, the functions of the information provider 118, the content distributor 122, and the display processing section 126 illustrated in FIG. 5 are implemented. Among them, the information provider 118 and the content distributor 122 take on functions as the Web server of the affiliation utility.

FIG. 10 illustrates a menu screen displayed on the display device 20 of the portable game machine 10. When the portable game machine 10 is powered ON, system software displays, on the display device 20, the menu screen in which icons of executable applications are arranged. When the user taps an area where any icon is displayed in the menu screen, the front touch pad 21 detects the tapped position and an application is selected. Here, the user taps an icon 300 and the system software activates the affiliation application (S20). By the activation of the affiliation application, the functions of the information acquirer 214, the determiner 216, the version comparator 222, the remote activator 228, and the display processing section 230 illustrated in FIG. 7 are implemented.

When the affiliation application is activated, the display processing section 230 displays an explanatory screen illustrated in FIG. 11 on the display device 20. In this explanatory screen, that the affiliation application is activated or that automatic install of an application is performed may be displayed by text. In the state in which the explanatory screen is displayed, the search section 212 broadcasts a search command in the LAN formed by the AP 2 to search for a Web server (S22).

In the stationary game machine 3, when receiving the search command, the information provider 118 performs unicast of predetermined information to the portable game machine 10 (S24). In the information provided by the information provider 118, identification information (title ID) to identify the application (game) to be activated in the portable game machine 10 in the affiliation mode is included.

In the portable game machine 10, the information acquirer 214 acquires the provided information and the determiner 216 determines whether or not the portable game machine 10 has the game identified by the title ID included in the received information (S26). In the portable game machine 10, downloaded game software is installed into the memory card 78. Therefore, the determiner 216 may make a search about whether the game identified by the title ID has been installed in the memory card 78. Furthermore, the title ID of the installed game may be listed in advance. In this case, the determiner 216 may refer to the list and determine whether or not the game identified by the title ID has been installed.

If the portable game machine 10 does not have the game identified by the title ID (N of S26), the determiner 216 instructs the download processing section 224 to acquire this game from the stationary game machine 3. Upon receiving this instruction, the download processing section 224 transmits a download request to the stationary game machine 3 (S28). In the stationary game machine 3, the application executor 116 specifies, to the content distributor 122, the file of the portable version application 154 as the transmission target and the content distributor 122 distributes the portable version application 154 of "ABC tennis 3" to the portable game machine 10 (S30). In the portable game machine 10, the download processing section 224 downloads the portable version application 154 and the display processing section 230 displays the progress of the download as illustrated in FIG. 12. Upon the completion of the download, the download processing section 224 notifies the install processing section 226 of that the download has been completed. Upon receiving this notification, the install processing section 226 performs automatic install of the downloaded portable version application 154 (S32).

Upon the completion of the install, the application activator 218 automatically activates the game of "ABC tennis 3" and the application executor 220 executes it (S34). The application activated by the application activator 218 is the portable version application 154 illustrated in FIG. 6 and the functions of the application executor 220 are implemented by the main program.

Although the application activator 218 automatically activates the game after the completion of the install in this example, the user may activate the installed game from the menu screen after the completion of the install. In this case, the display processing section 230 displays, on the display device 20, a message indicating the activation method of the installed game in addition to the message indicating that the install has been completed. In the portable game machine 10, the menu screen is displayed by pressing down the HOME button 27. Therefore, the display processing section 230 provides the user with a message indicating pressing down the HOME button 27 and selecting the icon of the installed game as the activation method of the game. When the user operates the portable game machine 10 in accordance with the message, the application activator 218 activates the game of "ABC tennis 3" and the application executor 220 executes it.

The application executor 220 notifies the stationary game machine 3 of that the activation of the game has been completed (S36). This notification may be made as a result by making a search about whether the related game exists in the stationary game machine 3 for example. Due to this, in the stationary game machine 3, the application executor 116 executes the game of "ABC tennis 3" in the affiliation mode and ends the affiliation utility (S38). Furthermore, the application executor 116 notifies the portable game machine 10 of that "ABC tennis 3" is being executed in the affiliation mode (S40). Upon receiving this notification, the application executor 220 executes "ABC tennis 3" in the affiliation mode. The above flow enables the affiliation of the game in the stationary game machine 3 and the game in the portable game machine 10.

It has been explained that the title ID of the game title to be activated by the portable game machine 10 is included in the information provided from the information provider 118 to the portable game machine 10 in S24. The version information of this game title may be further included. Furthermore, in the provided information, the title ID and version information of a game title that is being activated in the stationary game machine 3 may be included. If the game identified by the title ID has been already installed in S26 (Y of S26), the portable game machine 10 does not need to download the portable version application 154 again and thus moves to the processing of S34, where the application activator 218 performs automatic activation of "ABC tennis." The automatic activation of the game refers to processing in which, without the need for user operation, the application activator 218 automatically activates the installed portable version application 154 when receiving notification of install completion from the install processing section 226 after the completion of install processing.

At this time, in the portable game machine 10, although the game has been already installed, there is a possibility of the occurrence of a trouble that affiliation with the game executed by the stationary game machine 3 is impossible because its version is old. Furthermore, if the portable game machine 10 has downloaded the portable version application 154 of the latest version from a content server and installed it, possibly a trouble that affiliation is impossible occurs because the version of the game being executed in the stationary game machine 3 is old. Therefore, the version comparator 222 may compare the version information of the game title already installed and the version information of the game title being executed in the stationary game machine 3 and determine whether or not both can affiliate. Information indicating whether or not affiliation is possible is acquired in advance from an external server or the like for example. If both cannot affiliate, the version comparator 222 updates the game title whose version is old. Specifically, if the version information of the game title being executed in the stationary game machine 3 is old, the version comparator 222 notifies the stationary game machine 3 of the version information of the stationary version application 152 that can affiliate with the portable version application 154 and instructs the stationary game machine 3 to download the stationary version application 152 with this version information from a content server. On the other hand, if the version information of the game title already installed in the portable game machine 10 is old, the version comparator 222 notifies the stationary game machine 3 of the version information of the portable version application 154 that can affiliate with the stationary version application 152 and instructs the stationary game machine 3 to download the portable version application 154 with this version information and provide it to the portable game machine 10. It is also possible for the portable game machine 10 to download the portable version application 154 directly from the content server.

As above, by making the information provided from the stationary game machine 3 in S24 include the title ID and version information of the game title being activated in the stationary game machine 3, the version comparator 222 is allowed to determine whether the stationary version application 152 and the portable version application 154 can affiliate.

The sequence described above as illustrated in FIG. 8 starts from the state in which the stationary game machine 3 and the portable game machine 10 have been already activated. However, as illustrated in alternate S13 in FIG. 8, the remote activator 228 of the portable game machine 10 has a function to perform remote activation of the stationary game machine 3 when the stationary game machine 3 is in the power-off state. The functions of the remote activator 228 are implemented, in a process illustrated in S13 that does not include S14 and S16, by activating the affiliation application and the remote activator 228 transmits a magic packet including the MAC address of the stationary game machine 3. The communication portion 100 and the activation controller 112 of the stationary game machine 3 are in the activated state even in the power-off state. When the activation controller 112 receives the magic packet via the communication portion 100, it powers on the stationary game machine 3 and the application activator 114 automatically activates a predetermined game in the affiliation mode. In this remote activation processing, the game to be automatically activated by the application activator 114 is set in advance and the sequence of S18 and the subsequent steps illustrated in FIG. 8 is carried out after the remote activation.

The present invention is described above based on the embodiment. It will be understood by those skilled in the art that this embodiment is exemplification and various modification examples are possible in combinations of the respective constituent elements and the respective processing processes thereof and such modification examples are also within the scope of the present invention.

In the sequence illustrated in FIG. 8, the example in which execution of a game in the affiliation mode is decided in the stationary game machine 3 is illustrated. However, if the game has been already installed in the portable game machine 10, execution of the game in the affiliation mode may be decided in the portable game machine 10. At this time, the activated game in the portable game machine 10 may make a search about whether the related game exists in the stationary game machine 3 and both may be executed in the affiliation mode if the related game exists.

For example, the portable version application 154 may be prevented from operating with the stationary version application 152 in the affiliation mode if the portable version application 154 is a trial version (demonstration version).

Furthermore, in the exemplary embodiment, it is illustrated that the stationary version application 152 and the portable version application 154 are included in the package software 150 and the content acquirer 120 downloads the package software 150 from a content server. However, the stationary version application 152 and the portable version application 154 may be separately downloaded. If the portable version application 154 is not held in the storage device 130 when the content distributor 122 receives a download request in S28 in FIG. 8, the content acquirer 120 may download the portable version application 154 from a content server and the content distributor 122 may distribute the downloaded portable version application 154 to the portable game machine 10.

REFERENCE SIGNS LIST

1 . . . Information processing system, 2 . . . AP, 3 . . . Stationary game machine, 10 . . . Portable game machine, 20 . . . Display device, 78 . . . Memory card, 100 . . . Communication portion, 110 . . . Processing portion, 112 . . . Activation controller, 114 . . . Application activator, 116 . . . Application executor, 118 . . . Information provider, 120 . . . Content acquirer, 122 . . . Content distributor, 124 . . . Install processing section, 126 . . . Display processing section, 130 . . . Storage device, 150 . . . Package software, 152 . . . Stationary version application, 154 . . . Portable version application, 200 . . . Communication portion, 210 . . . Processing portion, 212 . . . Search section, 214 . . . Information acquirer, 216 . . . Determiner, 218 . . . Application activator, 220 . . . Application executor, 222 . . . Version comparator, 224 . . . Download processing section, 226 . . . Install processing section, 228 . . . Remote activator, 230 . . . Display processing section, 250 . . . Storage device, 300 . . . Icon

INDUSTRIAL APPLICABILITY

The present invention can be utilized in the information processing field.

The invention claimed is:

1. A portable gaming device having a portable gaming platform, comprising:
   an information acquisition unit configured to acquire, from a stationary gaming device having a stationary gaming platform, identification information to identify a game to be activated in the portable device, the platforms being different from one another;
   a determination unit configured to determine whether or not the portable device has the game;
   an application activation unit configured to activate the game without downloading the game from a game source if the portable device has the game; and
   a download processor configured to transmit a download request to the game source and to acquire the game from the game source if the portable device does not have the game; wherein
   when the devices both have the game already installed, a version comparator compares version information of the game on the portable device and version information of the game on the stationary device, and determines whether the versions can affiliate, the determination being made based on information indicating whether affiliation is possible, such information being acquired in advance from an external source;
   affiliation between the devices is requested by the stationary device by the stationary device establishing an ad hoc network and a web server accessible through the ad hoc network, and requested by the portable device by the portable device broadcasting a search command, in the ad hoc network, to search for the web server, and the affiliation is effected by the search command being received by the web server;
   a package software on a content server includes a portable version of the game, which portable version is executable on the portable platform and not executable on the stationary platform, and includes a stationary version of the game, which stationary version is executable on the stationary platform and not executable on the portable platform;
   the portable device has intermittent access to the stationary device through the ad hoc network and intermittent access to the content server through a first network separate from the ad hoc network, and the stationary device has access to the content server through a second network separate from the ad hoc network and the first network;
   the game source is either the stationary device or the content server depending on the availability of access to the content server by the portable device;
   when the game source is the content server, the portable version is downloaded to the portable device directly from the content server through the first network; and
   when the game source is the stationary device, the portable version is first downloaded by the stationary device as part of the package software being downloaded from the content server by the stationary device through the second network, then extracted from the package software by the stationary device, then downloaded to the portable device directly from the stationary device through the ad hoc network.

2. The portable gaming device according to claim 1, wherein the information acquisition unit is configured to additionally acquire identification information to identify a game that is being activated in the stationary device in order to determine whether affiliation is possible between the game that is being activated in the stationary device and the game to be activated in the portable device.

3. The portable gaming device according to claim 1, wherein the devices have different platforms.

4. The portable gaming device according to claim 1, further comprising an install processor configured to perform automatic install of the game acquired by the download processing section.

5. The portable gaming device according to claim 4, wherein the application activation unit is configured to activate the game installed by the install processing section.

6. The portable gaming device according to claim 1, wherein a function of the information acquisition unit is implemented through execution of an affiliation application.

7. The portable gaming device according to claim 1, wherein a remote activator of the portable device performs remote activation of the game on the stationary device into an affiliation mode when the stationary device is in a power-off state.

8. An information processing system that is so configured as to include a stationary gaming device and a portable gaming device having a gaming platform different from a gaming platform of the stationary device,
   the stationary device including
      a stationary device install processor configured to install a stationary version of a game to be executed in the stationary device, and
      a storage device that holds a portable version, of the game, to be executed in the portable device, and
   the portable device including
      an information acquisition unit configured to acquire, from the stationary device, identification information to identify the game,
      a determination unit configured to determine whether or not the portable device has the game,
      a download processor configured to transmit a download request to a game source and to acquire the game from the game source if the portable device does not have the game, and
      a portable device install processor configured to perform automatic install of the game acquired by the download processing section;
   wherein
      when the devices both have the game already installed, a version comparator compares version information of the stationary version of the game and version information of the portable version of the game, and determines whether the game versions can affiliate, the determination being made based on information indicating whether affiliation is possible, such information being acquired in advance from an external source;
      affiliation between the devices is requested by the stationary device by the stationary device establishing an ad hoc network and a web server accessible through the ad hoc network, and requested by the portable device by the portable device broadcasting a search command, in the ad hoc network, to search for the web server, and the affiliation is effected by the search command being received by the web server;
      a package software on a content server includes the portable version of the game, which portable version is executable on the portable platform and not executable on the stationary platform, and includes the stationary version of the game, which stationary version is executable on the stationary platform and not executable on the portable platform;

the portable device has intermittent access to the stationary device through the ad hoc network and intermittent access to the content server through a first network separate from the ad hoc network, and the stationary device has access to the content server through a second network separate from the ad hoc network and the first network;

the game source is either the stationary device or the content server depending on the availability of access to the content server by the portable device;

when the game source is the content server, the portable version is downloaded to the portable device directly from the content server through the first network; and when the game source is the stationary device, the portable version is first downloaded by the stationary device as part of the package software being downloaded from the content server by the stationary device through the second network, then extracted from the package software by the stationary device, then downloaded to the portable device directly from the stationary device through the ad hoc network.

9. The information processing system according to claim 8, wherein the stationary device further includes a stationary version execution unit configured to execute the installed stationary version;

the portable device further includes a portable version execution unit configured to execute the installed portable version; and the stationary version and the portable version execute processing in which the stationary version and the portable version affiliate.

10. The information processing system according to claim 8, wherein a remote activator of the portable device performs remote activation of the game on the stationary device into an affiliation mode when the stationary device is in a power-off state.

11. A portable gaming device operating under the control of a software program to cause the portable device to implement functions, comprising:

a function to acquire identification information to identify a game to be activated in the portable device from a stationary gaming device having a gaming platform different from a gaming platform of the portable device;

a function to determine whether or not the portable device has the game identified by the identification information;

a function to order activation of the game without downloading the game from the stationary device if the portable device has the game; and a function to transmit a download request to a game source and acquire the game from the game source if the portable device does not have the game, wherein when the devices both have the same game already installed, a version comparator compares version information of the game installed on the portable device and version information of the game installed on the stationary device, and determines whether the games can affiliate, the determination being made based on information indicating whether affiliation is possible, such information being acquired in advance from an external source;

affiliation between the devices is requested by the stationary device by the stationary device establishing an ad hoc network and a web server accessible through the ad hoc network, and requested by the portable device by the portable device broadcasting a search command in the ad hoc network, to search for the web server, and the affiliation is effected by the search command being received by the web server;

a package software on a content server includes a portable version of the game, which portable version is executable on the portable platform and not executable on the stationary platform, and includes a stationary version of the game, which stationary version is executable on the stationary platform and not executable on the portable platform;

the portable device has intermittent access to the stationary device through the ad hoc network and intermittent access to the content server through a first network separate from the ad hoc network, and the stationary device has access to the content server through a second network separate from the ad hoc network and the first network;

the game source is either the stationary device or the content server depending on the availability of access to the content server by the portable device;

when the game source is the content server, the portable version is downloaded to the portable device directly from the content server through the first network; and when the game source is the stationary device, the portable version is first downloaded by the stationary device as part of the package software being downloaded from the content server by the stationary device through the second network, then extracted from the package software by the stationary device, then downloaded to the portable device directly from the stationary device through the ad hoc network.

12. The portable gaming device operating under the control of a software program according to claim 11, wherein a remote activator function implemented by the portable device performs remote activation of the game on the stationary device into an affiliation mode when the stationary device is in a power-off state.

13. A statutory, non-transitory computer-readable recording medium, encoded with a data structure, in which a program for a portable gaming device is recorded, the program for causing the portable device to execute actions, comprising:

acquiring identification information to identify a game to be activated in the portable device from a stationary gaming device having a gaming platform different from a gaming platform of the portable device;

determining whether or not the portable device has the game identified by the identification information;

ordering activation of the game without downloading the game from the stationary device if the portable device has the game; and transmitting a download request to a game source and acquiring the game from the game source if the portable device does not have the game, wherein when the devices both have the same game already installed, a version comparator compares version information of the game installed on the portable device and version information of the game installed on the stationary device, and determines whether the game versions can affiliate, the determination being made based on information indicating whether affiliation is possible, such information being acquired in advance from an external source;

affiliation between the portable device and the stationary device is requested by the stationary device by the stationary device establishing an ad hoc network and a web server accessible through the ad hoc network, and requested by the portable device by the portable device broadcasting a search command, in the ad hoc network to search for the web server, and the affiliation is effected by the search command being received by the web server;

a package software on a content server includes a portable version of the game, which portable version is executable on the portable platform and not executable on the stationary platform, and includes a stationary version of the game, which stationary version is executable on the stationary platform and not executable on the portable platform;

the portable device has intermittent access to the stationary device through the ad hoc network and intermittent access to the content server through a first network separate from the ad hoc network, and the stationary device has access to the content server through a second network separate from the ad hoc network and the first network;

the game source is either the stationary device or the content server depending on the availability of access to the content server by the portable device;

when the game source is the content server, the portable version is downloaded to the portable device directly from the content server through the first network; and when the game source is the stationary device, the portable version is first downloaded by the stationary device as part of the package software being downloaded from the content server by the stationary device through the second network, then extracted from the package software by the stationary device, then downloaded to the portable device directly from the stationary device through the ad hoc network.

14. The statutory, non-transitory computer-readable recording medium according to claim 13, wherein a remote activator of the portable device performs remote activation of the game on the stationary device into an affiliation mode when the stationary device is in a power-off state.

* * * * *